(12) United States Patent
West et al.

(10) Patent No.: US 12,271,496 B2
(45) Date of Patent: Apr. 8, 2025

(54) SYSTEM AND METHOD FOR THIRD-PARTY PASSWORD-LESS ACCESS TO A SECURE DATABASE

(71) Applicant: Medical Data Networks, LLC, Lewes, DE (US)

(72) Inventors: Benjamin West, San Diego, CA (US); Earle H West, III, Marlboro, NJ (US)

(73) Assignee: Medical Data Networks LLC, Lewes, DE (US)

( * ) Notice: Subject to any disclaimer, the term of this patent is extended or adjusted under 35 U.S.C. 154(b) by 315 days.

(21) Appl. No.: 17/521,848

(22) Filed: Nov. 8, 2021

(65) Prior Publication Data

US 2023/0141952 A1 May 11, 2023

Related U.S. Application Data

(60) Provisional application No. 63/204,986, filed on Nov. 9, 2020.

(51) Int. Cl.
*G06F 21/62* (2013.01)
*G06F 1/16* (2006.01)

(52) U.S. Cl.
CPC .......... *G06F 21/6218* (2013.01); *G06F 1/163* (2013.01)

(58) Field of Classification Search
CPC .............................. G06F 21/6218; G06F 1/163
See application file for complete search history.

(56) References Cited

U.S. PATENT DOCUMENTS

| | | | | |
|---|---|---|---|---|
| 7,058,971 B1 * | 6/2006 | Horikiri | ................ | H04L 9/3226 713/168 |
| 2006/0037068 A1 * | 2/2006 | Hollberg | ................ | G06F 21/604 726/7 |
| 2006/0143189 A1 * | 6/2006 | Imaeda | ................ | H04L 63/102 |
| 2013/0074168 A1 * | 3/2013 | Hao | ................ | H04L 9/3213 726/7 |
| 2019/0108326 A1 * | 4/2019 | Fujimaki | ............. | G06F 21/6218 |
| 2021/0058256 A1 * | 2/2021 | Nishimura | .......... | H04L 63/0892 |
| 2021/0092102 A1 * | 3/2021 | Hathaway | ........... | H04L 63/0428 |

* cited by examiner

*Primary Examiner* — Boris Gorney
*Assistant Examiner* — Robert F May
(74) *Attorney, Agent, or Firm* — Fish & Richardson P.C.

(57) ABSTRACT

Methods, systems, and computer programs for providing third-party password-less access to a secure database. A method can include receiving from a first user device, first data indicative of a request to provide password-less access to a data structure in a secure database, encoding a set of permissions into a data string, the encoded set of permissions including (a) a copy of the access key and (b) one or more filtering parameters, generating an electronic message that includes the data string, providing the electronic message to a second user device, receiving data indicative of a selection of the displayed data string, the received data includes the encoded set of permissions, decoding the received data to obtain the set of permissions, accessing the data structure in the secure database using the obtained set of permissions, and providing, to the second user device, password-less access to the real-time stream of content.

18 Claims, 3 Drawing Sheets

SYSTEM AND METHOD FOR THIRD-PARTY PASSWORD-LESS ACCESS TO A SECURE DATABASE

CROSS-REFERENCE TO RELATED APPLICATIONS

This application claims the benefit of U.S. Application Ser. No. 63/204,986 filed on Nov. 9, 2021 and titled "Method and Apparatus for Sharing Electronic Medical Records and Applications," the entire contents of which is incorporated herein by reference.

BACKGROUND

The present disclosure relates to system that enable sharing of secure data records.

SUMMARY

According to one innovative aspect of the present disclosure, a method for enabling third-party password-less access to a secure database is disclosed. In one aspect, the method can include actions of receiving, by one or more computers and from a first user device, first data indicative of a request to provide password-less access to a data structure in a secure database that is otherwise accessible via an application interface requiring a user-id and password, wherein the data structure includes a plurality of fields, wherein the plurality of fields include at least (i) a first field storing data indicating an access key and (ii) a second field that identifies a real-time stream of content generated by a wearable device, encoding, by one or more computers, a set of permissions into a data string that, when rendered by a user device, causes the user device to display a hyperlinked uniform resource locator that references the data structure in the secure database and includes the encoded set of permissions, the encoded set of permissions including (a) a copy of the access key and (b) one or more filtering parameters, generating, by one or more computers, an electronic message that includes the data string, providing, by one or more computers, the electronic message to a second user device, wherein the second user device is configured to receive, render the electronic message, and display a hyperlinked uniform resource locator that includes the encoded set of permissions, receiving, by one or more computers, data indicative of a selection of the displayed hyperlinked uniform resource locator, the received data includes the encoded set of permissions, decoding, by one or more computers, the received data to obtain the set of permissions, accessing, by one or more computers, the data structure in the secure database using the obtained set of permissions, and providing, by one or more computers and to the second user device, password-less access to the real-time stream of content associated with the accessed data structure and generated by the wearable device.

Other versions include corresponding systems, apparatus, and computer programs to perform the actions of methods defined by instructions encoded on computer readable storage devices.

These and other versions may optionally include one or more of the following features. For instance, in some implementations, the access key is data that is used to index the data structure in the secure database.

In some implementations, the one or more filtering parameters can impose an access control limit access to the identified real-time stream of content generated by the wearable device.

In some implementations, the one or more filtering parameters can include an expiration date or expiration time that, when the expiration date or expiration time is reached, causes access, by the second device, to the identified real-time stream of content data to be terminated.

In some implementations, the one or more filtering parameters include a data and time period when the identified real-time stream of content generated by the wearable device can be accessed by a user of the second user device.

In some implementations, the received data includes additional data that identifies a user of the second user device.

In some implementations, accessing, by one or more computers, the data structure in the secure database using the obtained set of permissions can include determining, by one or more computers, the additional data that identifies the user of the second device is on a white list, and based on determining, by one or more computers, that the additional data that identifies the user of the second device is included on the white list, using data within the second field of the data structure to access the real-time stream of content generated by a wearable device.

In some implementations, the method can further include obtaining, by one or more computers, an alert message from the second user device, wherein the alert message indicates that a value of the real-time stream of content has satisfied one or more predetermined thresholds, and based on obtaining, by one or more computers, the obtained alert message, transmitting, by one or more computers, an notification to a third user device that is identified in a user profile of a person wearing the wearable device.

These and other innovative aspects of the present disclosure are described in more detail below in the detailed description, in the drawings, and in the accompanying claims.

DETAILED DESCRIPTION

The present disclosure is directed towards systems, methods, and computer programs for enabling third-party access to a secure database without a password. A secure database, for purposes of the present disclosure, is intended to mean a database that stores information related to a user and is secured via password. Such other authenticating information can include, for example, biometric information, an RSA token, SMS verification codes, or the like. Using the techniques of the present disclosure, a user that has (i) a secured set of data stored in a secure database or (ii) is streaming, in real time, secure data to a database can grant access to the aforementioned secured data (i.e., either secured stored data or secured streaming data) to a third-party without providing a password required to access the secured data to the third-party. Thus, the present disclose solves the technological problem of sharing password protected, secured information with a third-party.

Using the disclosed techniques, a user can grant read-only, third-party access, on an as needed basis, to sensitive, password protected data without divulging the password of the users to whom the secured information is associated. Likewise, the present disclosure avoids requiring that a separate password be issued to the third party. This helps keep the user's passwords secure while also easing the administrative burden user account and password creation.

Figure 1:
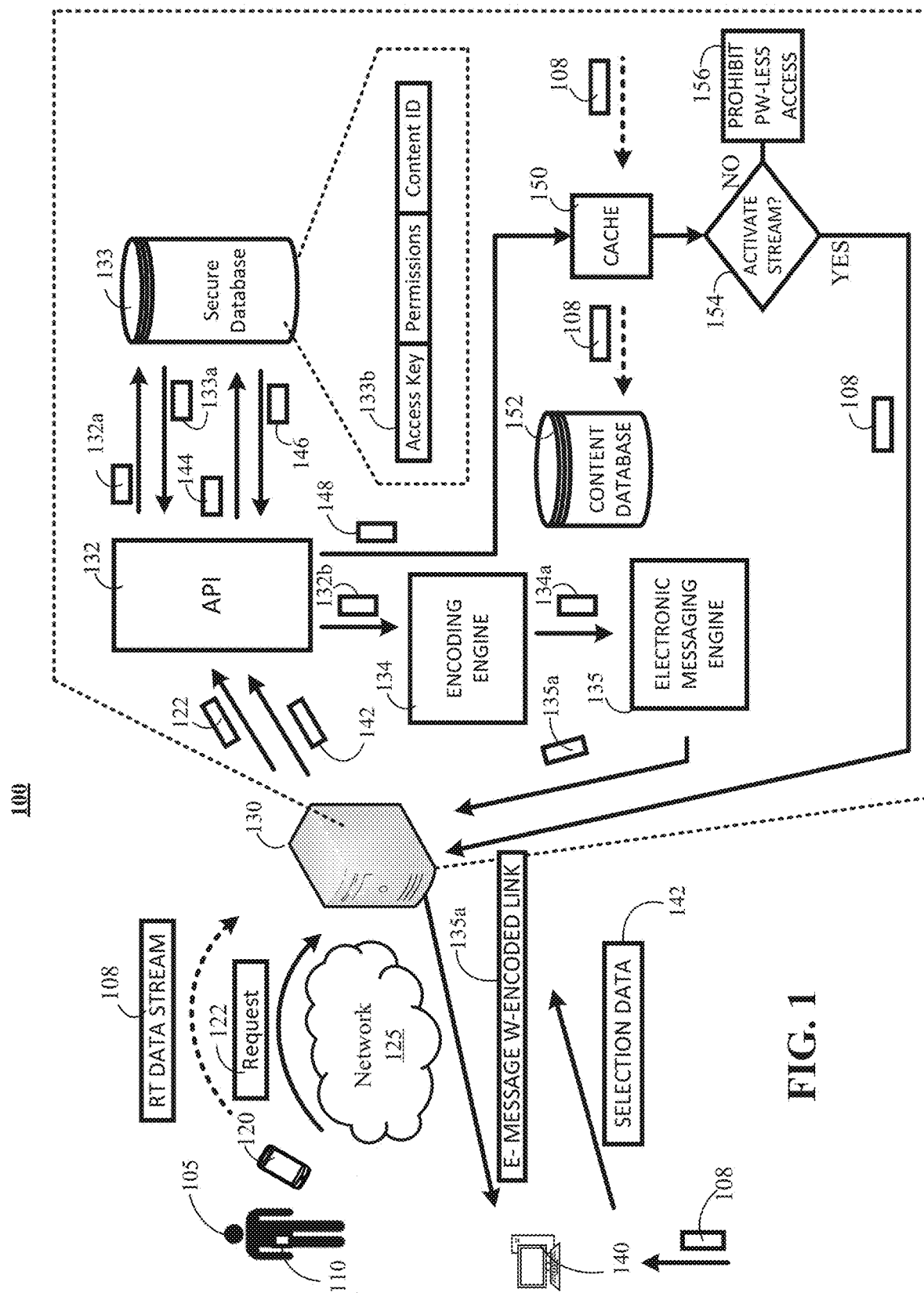
FIG. 1 is a diagram of a system for third-party access to a secure database without a password.

FIG. 1 is a diagram of a system 100 for third-party access to a secure database without a password. The system 100 can include a first user device 120, a network 125, an application server 130, and second user device 140. The first user device 120 is depicted as a mobile device and the second user device 140 is depicted as a desktop computer. However, the present disclosure is not so limited. Instead, each respective user device 120, 140 can be any user device include, but not limited to, for example, a mobile device, a smart phone, a smart watch, a tablet, a laptop, a desktop, or the like. In some implementations, such as that depicted by FIG. 1, the system 100 can also include a wearable device 110. However, the present disclosure is not limited to implementations having a wearable device.

The system 100 is configured to facilitate secured and real-time streaming of sensitive information. For example, in some implementations, such as that depicted by FIG. 1, the system 100 can facilitate a real-time data stream 108 from a wearable device 110 that is worn by the person's 105. An example of a wearable device 110 can include an glucose monitor. In such an example, the real-time data stream 108 can be data indicating the person's 105 glucose level. The real-time data stream 108 can be streamed across the network 125 to the application service 130 via the cache 150.

The cache 150 can temporarily buffer the real-time data stream 108 prior to storing the real-time data stream 108 in the content database 152. The temporary storage in the cache 150 is to determine whether the cache 150 or decisioning module 154 have been instructed to provide access to the secured, real-time data stream 108 to a third-party. Absent being instructed to provide the secured, real-time data stream 108 to another user device, the cached data will be stored, after expiration of a threshold period of time, in the content database 152.

The content database 152 can only be accessed using the index data structure 133b, each content data stream can be associated with a corresponding index data structure 133b. Accordingly, absent a request for the index data structure 133b for a particular content stream 108, the real-time data stream cannot be accessed. The person 105 can access the real-time stream 108 by providing a user id and user password to the application server 130. The application server 130 can provide the user if and user password to the API 132 and the API 132 can authenticate the request against the permissions in the index data structure 133b. If authenticated, the API 132 can access the secured database 133, obtained the index data structure 133b and use the content ID to identify and access the real-time data stream 108, the person's 105 stored data in the content database 152, or a combination here.

The person 105 can also grant third-party access to the secured, real-time data stream 108 or the secured content stored in the content database 152 without use of a password. Granting third-party access to the secured, real-time data stream 108 can begin with the person 105 using the device 120 to generate a request 122 to provide third-party password-less access to an index data structure 133b in the secure database 133. The request 122 can include data identifying a third-party, contact information for the third-party such as an email address or phone number (which may also function as the identifier of the third party), data identifying the secured data or real-time content stream to be shared, the person's password or other authorizing credentials (e.g., biometrics), data identifying permissions for the third party's access/use/manipulation of the secured data or real-time content stream, or a combination thereof. A third party can include a person not already having access to the secured data or real-time content stream 108. Such a third party can include, for example, a doctor, nurse, family member, neighbor, creditor, mortgage financing agent, or the like.

In some implementations, at least a portion of the request 122 or data that is to be included in the request 122 can be generated, or otherwise obtained, by the person 105 using the first user device 120 to capture an image of a QR-code. The first user device 120 can decode the QR-code and use data from the decoded QR-code to populate the at least a portion of the request 122.

The request 122 can be transmitted, by the first user device 120, to the application server 130 via the network 125. The network 125 can include one or more of a LAN, a WAN, a wired Ethernet, Wi-Fi, cellular network, the Internet, or any combination thereof. The application server 130 can receive the request 122 and provide the request as an input to the application programming interface (API) 132. The application server 130 can include one or more computers located in the same geographic region or multiple different computers that are geographically dispersed amongst disparate geographic regions. The application server 130 can host one or more processing modules, engines, hardware, and/or interfaces including an API 132, a secure database 133, an encoding engine 134, an electronic messaging engine 135, a cache 150, and a content database 152. Each of these modules, engines, hardware units, or interfaces can include software instructions, hardware units, or a combination thereof.

The API 132 can use data provided in the request 122 to gain authorized access 132a to the secured database 133. The API 132 can access 132a the secure database to obtain the index data structure 133b that corresponds to the content ID of the real-time data stream 108 identified by the request 122. The result 133a of the access 132a request is the access key, the set of permissions, or both, that are related to the content ID via the index data structure 133b. The API 132 can provide the obtained access key, the set of permissions, or both, as an input 132b to the encoding engine. The access key can be used to access secure database alone or in conjunction with the set of permissions. The set of permissions can include, for example, a white list, one or more filtering parameters, or other criteria that limit use of the real-time content stream 108, access to the real-time content stream 108, or both. In some implementation, the set of permissions can be used to refer to the access key, permissions data, filtering parameters, other limiting criteria, or a combination thereof. Filtering parameters can include, for example, a time window of underlying data and/or time window of request, delayed data and/or current real-time, a geo-location fenced in area that requires the second user device 140 or person using the second user device 140 to be within a radius of a particular latitude and longitude, function capabilities such as read only with redactions, read only, read/write, update data, administer read/write/updates, and/ or the like. The content ID can include data can be used to identify, distinguish, and access the real-time content stream 108 from other content streams or other secure data.

The encoding engine 134 is configured to obtain the set of permissions, the access key, or both, and encode the access key, the set of permissions, or both, into a data string. The data string can be of particular type such that, when rendered by a user device such as the second user device 140, causes the second user device 140 to display a hyperlinked uniform resource locator that references the index data structure 133*b* in the secure database and also includes the encoded set of permissions, the access key, or both. The set of permissions, the access key, or both, can be encoded in a variety of different ways including, but not limited to Advanced Encryption Standard (AES) Advanced Encryption Standard using 128 bit blocks, Rivest-Shamir-Adleman (RSA), Triple DES (Data Encryption Standard), Twofishj, TLS 1.3, or the like. In some implementations, once the set of permissions, the access key, or both, are encoded into the data string, the data string can merely be appended to the back of URL, the front of a URL, or inserted in a URL at a location that is between the front and back of the URL.

The set of permissions can include any data that can be used to access to the real-time content stream 108 via the secure database 133, limit access to the real-time content stream 108 via the secure database 133, or define access to the real-time content stream 108 via the secure database 135, or any combination thereof. In some implementations, the encoded set of permissions can include data defining each of the permissions granted to the third party. Likewise, the permissions in the index data structure 133*b* can include data such as a white list or other filtering criteria required to process selection data received from the second user device 140 to enable and access to the set of permissions included in an encoded data string sent to the second user device 410. The encoding engine 134 can provide the encoded data string, a URL containing the encoded data string, or both, as an input to the electronic messaging engine 135.

The electronic messaging engine 135 can generate an electronic message 135*a* for transmission to a second user device 140 of the third party identified by the request 122. The electronic message 135 can include an email message, an SMS text message, an MMS message, or any other type of electronic message. Electronic messaging engine 135 can include the encoded data string in the electronic message and transmit the generated electronic message 135*a* to an address associated with a third party device, which in this example is the second user device 140.

The second user device 140 can receive the electronic message 135*a* that includes the URL with the encoded data string. The second user device 140 can obtain the electronic message 135*a*, detect the URL with the encoded data string, and when the electronic message is opened responsive to a command from a user of the second user device 140, render the electronic message. Rendering the electronic message includes displaying the URL with encoded data string as a selected hyperlink. The selectable hyperlink can include encoded data string, which is an encrypted representation of the set of permissions provided to the third party user of the second user device 140 for accessing the real-time data stream 108.

The user of the second user device 140 can select the selectable hyperlink that includes the encoded data string. Selection of the selectable hyperlink that includes the encoded data string causes selection data 142 to be transmitted to the application server 130 via the network 125. The application server 130 can obtain the selection data 142 and provide the selection data as an input to the API 132. The selection data can include the encoded data string that was generated by the encoding engine 134. That is, the selection data can include the encoded set of permissions that enable access to the indexed data structure 133*b*. This encoded set of permission enables the third-party user of second user device 140 to achieve password-less access to the real-time content stream 108 via the secured database 133.

The API 132 can decode the selection data 143. Decoding the selection data 143 can include parsing the selection data 142 to obtain the encoded data string that was generated by the encoding engine 134. The API 132 can decode the encoded data string to obtain the set of permissions, access key, or both, that was encoded into the encoded data string subsequent to the request 122 submitted by the person 105. The API 132 can access 144 the secure database 133 to retrieve the indexed data structure 133*b*. The API 132 can access the matching indexed data structure 133*b* by using the access key obtained for the selection data 142 to search each of the index data structures in the secure database 133 until a match is found. Once the API 132 identifies the matching index data structure 133*b*, the API 132 can determine a level of access, if any, the second user device is to have to particular secured content or real-time data stream. In some implementations, this is achieved based on the permissions obtained from the selection data and the permissions associated with each indexed data structure. In other implementations, the API can determine, based on filtering parameters in the decoded permissions data, that second user device is only to have access to the content identified by the content ID field of the index data structure record for a period of time identified by the one or more filtering parameters. Alternatively, or in addition, the API can also determine, based on the filtering parameters, the permissions, or both, that the second user device 140 is to have its access terminated after a specific data, time, or both.

In some implementations, the selection data 142 can also include a user identifier. The user identifier can be a device identifier, a phone number, an email address, a name, a social media profile name, a social media handle, or the like. In such implementations, the API 132 can determine whether the user identifier obtained from the selection data 142 is on a white list, black list, or both, before proceeding to the permitting access to the index data structure 133*b* in the secure database 133.

The API 132 can obtain the content identifier from the index data structure 133*b* that has an access key that matches the access key obtained from the selection data 142. The application server 130 can use the API to configure the application server 130 to stream the real-time content stream 108 to the second user device 140 without a password.

The API can instruction 148 that alters a sharing flag associated with the cache 140, a cache control unit, or other processing engine to activate sharing of the content stream 108. In some implementations, for example, a decisioning module 154 can be employed that functions as a real-time streaming content distribution switch. Such a decisioning module 154 may be implemented as a software instructions in a memory device that can be configured a particular third-party user device address, content identifier, and one or more permissions such as filtering parameters, time durations, or the like, that define the third-party user's access to the real-time content stream. If the decisioning module 154 is activated to enable sharing using the instruction 148, the decisioning module can enable streaming of the real-time content 108 from the from the wearable device 110 over the network 125 through the cache 150 and back across the network 125 and to the second user device 140. The sharing of the stream may be activated for as long as the permissions associated with the selection data 142 allow sharing. If the sharing stream is deactivated, perhaps because selection data having criteria that did not satisfying one or more permissions requirements, then the decisioning module 154 can prohibit password-less access at stage 156.

Figure 2:
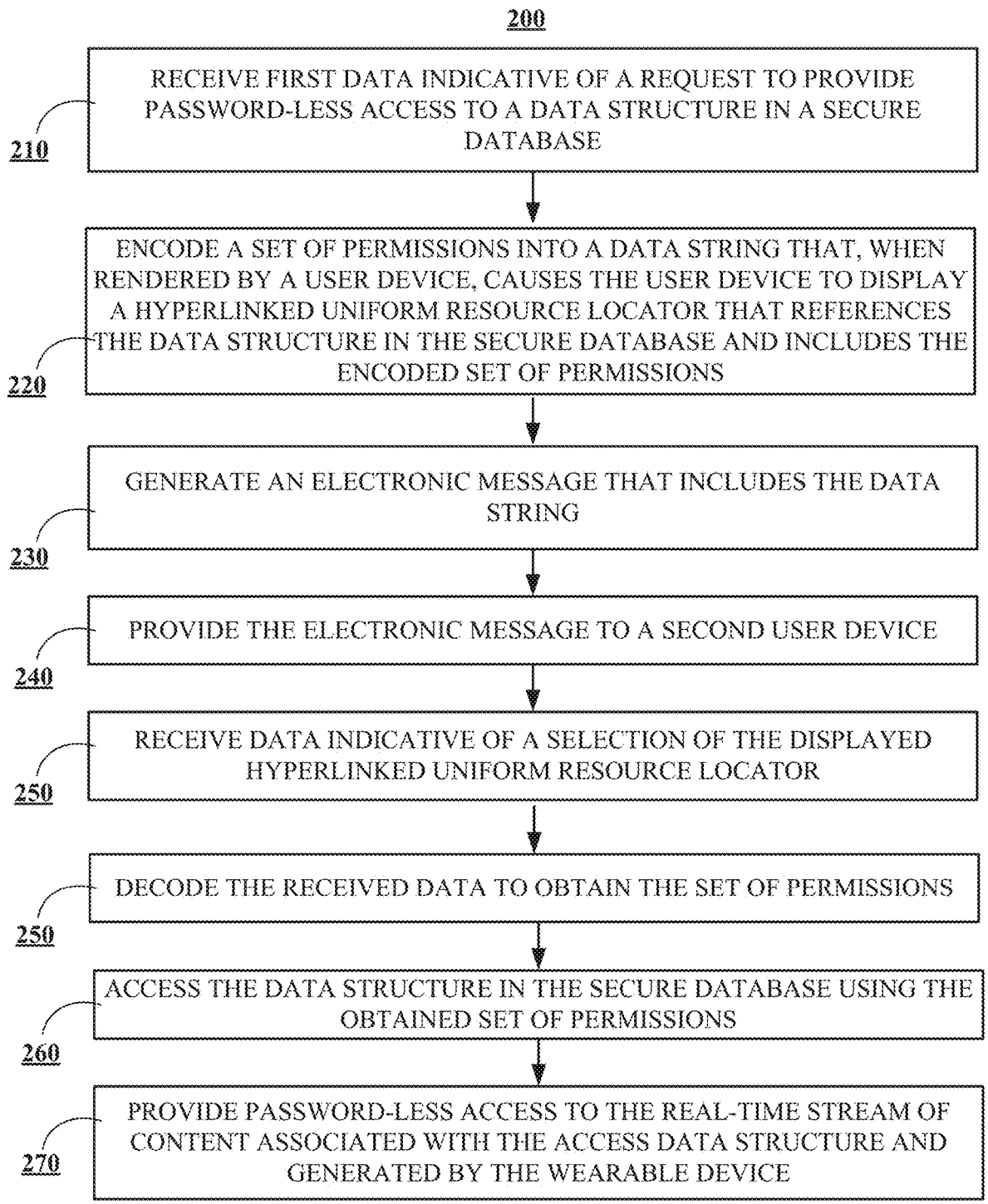
FIG. 2 is a flowchart of a process for third-party access to a secure database without a password.

FIG. 2 is a flowchart of a process 200 for third-party access to a secure database without a password. The process 200 is described in more detail below with as being performed by a system such as the system 100.

A system can begin performance of the process 200 by using one or more computers to receive 210, from a first user device, first data indicative of a request to provide password-less access to a data structure in a secure database that is otherwise accessible via an application interface requiring a user-id and password, wherein the data structure includes a plurality of fields, wherein the plurality of fields include at least (i) a first field storing data indicating an access key and (ii) a second field that identifies a real-time stream of content generated by a wearable device. The real-time stream of content can include a stream of real-time readings from a wearable glucose meter, a real-time stream of data indicative of balances in a brokerage account, real-time data stream indicative of wallet balances in a cryptocurrency account, a real-time stream of data indicative of account balances in a bank account, or the like.

In some implementations, the access key can include data that is used to index the data structure in the secure database. In some implementations, the one or more filtering parameters impose an access control limit access to the identified real-time stream of content generated by the wearable device. In some implementations, the one or more filtering parameters include an expiration date or expiration time that, when the expiration date or expiration time is reached, causes access, by the second device, to the identified real-time stream of content data to be terminated. In some implementations, the one or more filtering parameters include a data and time period when the identified real-time stream of content generated by the wearable device can be accessed by a user of the second user device. In some implementations, the received data can include additional data that identifies a user of the second user device.

In some implementations, the filtering parameters can include, for example, a time window of underlying data and/or time window of request, delayed data and/or current real-time, a geo-location fenced in area that requires the third-party user device or third party using the second user device to be within a radius of a particular latitude and longitude, function capabilities such as read only with redactions, read only, read/write, update data, administer read/write/updates, and/or the like.

The system can continue execution of the process 200 by using one or more co putters to encode 220 a set of permissions into a data string that, when rendered by a user device, causes the user device to display a hyperlinked uniform resource locator that references the data structure in the secure database and includes the encoded set of permissions, the encoded set of permissions including (a) a copy of the access key and (b) one or more filtering parameters.

In some implementations, the set of permissions, the access key, or both, can be encoded in a variety of different ways including, but not limited to encoding using Advanced Encryption Standard (AES) Advanced Encryption Standard using 128 bit blocks, Rivest-Shamir-Adleman (RSA), Triple DES (Data Encryption Standard), Twofishj, TLS 1.3, or the like. In some implementations, once the set of permissions, the access key, or both, are encoded into the data string, the data string can merely be appended to the back of URL, the front of a URL, or inserted in a URL at a location that is between the front and back of the URL.

The system can continue execution of the process 200 by using one or more computers to generate 230 an electronic message that includes the data string. The electronica message can include an email message, an SMS message, an MMS message, or any other type of electronic message.

The system can continue execution of the process 200 by using one or more computers to provide 240 the electronic message to a second user device. The second user device can be configured to receive, render the electronic message, and display a hyperlinked uniform resource locator that includes the encoded set of permissions.

The system can continue execution of the process 200 by using one or more computers to receive 250 data indicative of a selection of the displayed hyperlinked uniform resource locator, the received data includes the encoded set of permissions. The data indicative of the selection of the displayed hyperlinked uniform resource locator can include the encoded data string that was generated at stage 220. That is, the data indicative of the selection of the displayed hyperlink can include the encoded set of permissions that enable access to the data structure in the secure database. This encoded set of permission enables the third-party user of a second user device to achieve password-less access to the real-time content stream.

The system can continue execution of the process 200 by using one or more computers to decode 260 the received data to obtain the set of permissions.

The system can continue execution of the process 200 by using one or more computers to access 270 the data structure in the secure database using the obtained set of permissions. In some implementations, the stage 270 of accessing can include determining, by one or more computers, the additional data that identifies the user of the second device is on a white list, and based on determining, by one or more computers, that the additional data that identifies the user of the second device is included on the white list, using data within the second field of the data structure to access the real-time stream of content generated by a wearable device. Though an example of white lists is provided, where a white list is understood to list user identifying information, device identifying information, or both, that are to be granted access, the present disclosure is not so limited. For example, black lists, which are generally understood to list user identifying information, device identifying information, or both, that are not to be granted access, can be used instead of white lists or in addition to white lists.

The system can continue execution of the process 200 by using one or more computers to provide 280, to the second user device, password-less access to the real-time stream of content associated with the accessed data structure and generated by the wearable device.

The system can also execute other optional features. For example, in some implementations, the system can one or more computers to obtain an alert message from the second user device, wherein the alert message indicates that a value of the real-time stream of content has satisfied one or more predetermined thresholds. For example, a third-party user such as a nurse, a doctor, or an intelligent agent (e.g., a software application, machine learning model, or the like) monitoring a real-time data stream can determine that a glucose reading of a wearable device worn by another person has satisfied a particular threshold, wherein satisfying the threshold can include being greater than the threshold or being less than the threshold. Then, in some implementations, the system can continue the process by using one or more computers to obtain the obtained alert message and then use one or more computers to transmit an notification to a third user device that is identified in a user profile of a person wearing the wearable device.

Figure 3:
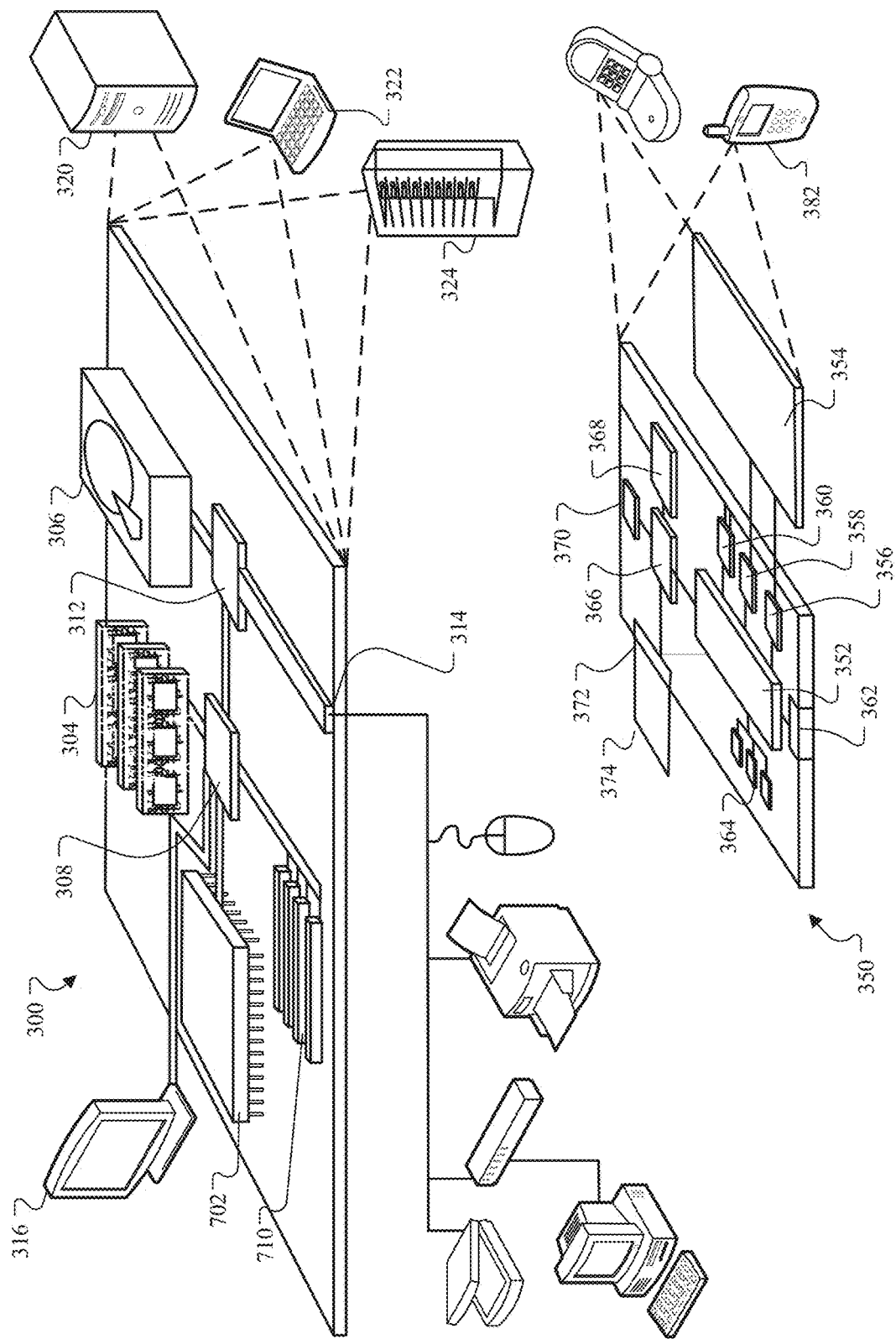
FIG. 3 is a block diagram of system components that can be used to implement a system for third-party access to a secure database without login credentials.

FIG. 3 is a block diagram 300 of system components that can be used to implement a system for third-party access to a secure database without a password.

Computing device 300 is intended to represent various forms of digital computers, such as laptops, desktops, workstations, personal digital assistants, servers, blade servers, mainframes, and other appropriate computers. Computing device 350 is intended to represent various forms of mobile devices, such as personal digital assistants, cellular telephones, smartphones, and other similar computing devices. Additionally, computing device 300 or 350 can include Universal Serial Bus (USB) flash drives. The USB flash drives can store operating systems and other applications. The USB flash drives can include input/output components, such as a wireless transmitter or USB connector that can be inserted into a USB port of another computing device. The components shown here, their connections and relationships, and their functions, are meant to be exemplary only, and are not meant to limit implementations of the inventions described and/or claimed in this document.

Computing device 300 includes a processor 302, memory 304, a storage device 306, a high-speed interface 308 connecting to memory 304 and high-speed expansion ports 310, and a low speed interface 312 connecting to low speed bus 314 and storage device 306. Each of the components 302, 304, 306, 308, 310, and 312, are interconnected using various busses, and can be mounted on a common motherboard or in other manners as appropriate. The processor 302 can process instructions for execution within the computing device 300, including instructions stored in the memory 304 or on the storage device 306 to display graphical information for a GUI on an external input/output device, such as display 316 coupled to high speed interface 308. In other implementations, multiple processors and/or multiple buses can be used, as appropriate, along with multiple memories and types of memory. Also, multiple computing devices 300 can be connected, with each device providing portions of the necessary operations, e.g., as a server bank, a group of blade servers, or a multi-processor system.

The memory 304 stores information within the computing device 300. In one implementation, the memory 304 is a volatile memory unit or units. In another implementation, the memory 304 is a non-volatile memory unit or units. The memory 304 can also be another form of computer-readable medium, such as a magnetic or optical disk.

The storage device 306 is capable of providing mass storage for the computing device 300. In one implementation, the storage device 306 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The information carrier is a computer- or machine-readable medium, such as the memory 304, the storage device 306, or memory on processor 302.

The high speed controller 308 manages bandwidth-intensive operations for the computing device 300, while the low speed controller 312 manages lower bandwidth intensive operations. Such allocation of functions is exemplary only. In one implementation, the high-speed controller 308 is coupled to memory 304, display 316, e.g., through a graphics processor or accelerator, and to high-speed expansion ports 310, which can accept various expansion cards (not shown). In the implementation, low-speed controller 312 is coupled to storage device 306 and low-speed expansion port 314. The low-speed expansion port, which can include various communication ports, e.g., USB, Bluetooth, Ethernet, wireless Ethernet can be coupled to one or more input/output devices, such as a keyboard, a pointing device, microphone/speaker pair, a scanner, or a networking device such as a switch or router, e.g., through a network adapter. The computing device 300 can be implemented in a number of different forms, as shown in the figure. For example, it can be implemented as a standard server 320, or multiple times in a group of such servers. It can also be implemented as part of a rack server system 324. In addition, it can be implemented in a personal computer such as a laptop computer 322. Alternatively, components from computing device 300 can be combined with other components in a mobile device (not shown), such as device 350. Each of such devices can contain one or more of computing device 300, 350, and an entire system can be made up of multiple computing devices 300, 350 communicating with each other.

The computing device 300 can be implemented in a number of different forms, as shown in the figure. For example, it can be implemented as a standard server 320, or multiple times in a group of such servers. It can also be implemented as part of a rack server system 324. In addition, it can be implemented in a personal computer such as a laptop computer 322. Alternatively, components from computing device 300 can be combined with other components in a mobile device (not shown), such as device 350. Each of such devices can contain one or more of computing device 300, 350, and an entire system can be made up of multiple computing devices 300, 350 communicating with each other.

Computing device 350 includes a processor 352, memory 364, and an input/output device such as a display 354, a communication interface 366, and a transceiver 368, among other components. The device 350 can also be provided with a storage device, such as a micro-drive or other device, to provide additional storage. Each of the components 350, 352, 364, 354, 366, and 368, are interconnected using various buses, and several of the components can be mounted on a common motherboard or in other manners as appropriate.

The processor 352 can execute instructions within the computing device 350, including instructions stored in the memory 364. The processor can be implemented as a chipset of chips that include separate and multiple analog and digital processors. Additionally, the processor can be implemented using any of a number of architectures. For example, the processor 310 can be a CISC (Complex Instruction Set Computers) processor, a RISC (Reduced Instruction Set Computer) processor, or a MISC (Minimal Instruction Set Computer) processor. The processor can provide, for example, for coordination of the other components of the device 350, such as control of user interfaces, applications run by device 350, and wireless communication by device 350.

Processor 352 can communicate with a user through control interface 358 and display interface 356 coupled to a display 354. The display 354 can be, for example, a TFT (Thin-Film-Transistor Liquid Crystal Display) display or an OLED (Organic Light Emitting Diode) display, or other appropriate display technology. The display interface 356 can comprise appropriate circuitry for driving the display 354 to present graphical and other information to a user. The control interface 358 can receive commands from a user and convert them for submission to the processor 352. In addition, an external interface 362 can be provide in communication with processor 352, so as to enable near area communication of device 350 with other devices. External interface 362 can provide, for example, for wired communication in some implementations, or for wireless communication in other implementations, and multiple interfaces can also be used.

The memory 364 stores information within the computing device 350. The memory 364 can be implemented as one or more of a computer-readable medium or media, a volatile memory unit or units, or a non-volatile memory unit or units. Expansion memory 374 can also be provided and connected to device 350 through expansion interface 372, which can include, for example, a SIMM (Single In Line Memory Module) card interface. Such expansion memory 374 can provide extra storage space for device 350, or can also store applications or other information for device 350. Specifically, expansion memory 374 can include instructions to carry out or supplement the processes described above, and can include secure information also. Thus, for example, expansion memory 374 can be provide as a security module for device 350, and can be programmed with instructions that permit secure use of device 350. In addition, secure applications can be provided via the SIMM cards, along with additional information, such as placing identifying information on the SIMM card in a non-hackable manner.

The memory can include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 364, expansion memory 374, or memory on processor 352 that can be received, for example, over transceiver 368 or external interface 362.

Device 350 can communicate wirelessly through communication interface 366, which can include digital signal processing circuitry where necessary. Communication interface 366 can provide for communications under various modes or protocols, such as GSM voice calls, SMS, EMS, or MMS messaging, CDMA, TDMA, PDC, WCDMA, CDMA2000, or GPRS, among others. Such communication can occur, for example, through radio-frequency transceiver 368. In addition, short-range communication can occur, such as using a Bluetooth, Wi-Fi, or other such transceiver (not shown). In addition, GPS (Global Positioning System) receiver module 370 can provide additional navigation- and location-related wireless data to device 350, which can be used as appropriate by applications running on device 350.

Device 350 can also communicate audibly using audio codec 360, which can receive spoken information from a user and convert it to usable digital information. Audio codec 360 can likewise generate audible sound for a user, such as through a speaker, e.g., in a handset of device 350. Such sound can include sound from voice telephone calls, can include recorded sound, e.g., voice messages, music files, etc. and can also include sound generated by applications operating on device 350.

The computing device 350 can be implemented in a number of different forms, as shown in the figure. For example, it can be implemented as a cellular telephone 380. It can also be implemented as part of a smartphone 382, personal digital assistant, or other similar mobile device.

Various implementations of the systems and methods described here can be realized in digital electronic circuitry, integrated circuitry, specially designed ASICs (application specific integrated circuits), computer hardware, firmware, software, and/or combinations of such implementations. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor for displaying information to the user and a keyboard and a pointing device, e.g., a mouse or a trackball by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the systems and techniques described here, or any combination of such back end, middleware, or front end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Other Embodiments

A number of embodiments have been described. Nevertheless, it will be understood that various modifications can be made without departing from the spirit and scope of the invention. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

The invention claimed is:

1. A method for enabling third-party password-less access to a secure database, comprising:
   receiving, by one or more computers of an application server and from a first user device, first data indicative of a request to provide password-less access to a data structure in a secure database that is otherwise accessible via an application interface requiring a user-id and password, wherein the data structure includes a plurality of fields, wherein the plurality of fields include at least (i) a first field storing data indicating an access key and (ii) a second field that identifies a real-time stream of content generated by a wearable device;
   encoding, by the one or more computers of the application server, a set of permissions into a data string that, when rendered by a user device, causes the user device to display a hyperlinked uniform resource locator that references the data structure in the secure database and includes the encoded set of permissions, the encoded set of permissions including (a) a copy of the access key and (b) one or more filtering parameters;
   generating, by the one or more computers of the application server, an electronic message that includes the data string;
   providing, by the one or more computers of the application server, the electronic message to a second user device, wherein the second user device is configured to receive, render the electronic message, and display a hyperlinked uniform resource locator that includes the encoded set of permissions;
   receiving, by the one or more computers of the application server, data indicative of a selection of the displayed hyperlinked uniform resource locator, the received data includes the encoded set of permissions;
   decoding, by the one or more computers of the application server, the received data to obtain the set of permissions;
   accessing, by the one or more computers of the application server, the data structure in the secure database using the obtained set of permissions;
   providing, by the one or more computers of the application server and to the second user device, password-less access to the real-time stream of content associated with the accessed data structure and generated by the wearable device;
   obtaining, by the one or more computers of the application server, an alert message from the second user device, wherein the alert message indicates that a value of the real-time stream of content has satisfied one or more predetermined thresholds; and
   based on obtaining, by the one or more computers of the application server, the obtained alert message, transmitting, by the one or more computers of the application server, a notification to a third user device that is identified in a user profile of a person wearing the wearable device.

2. The method of claim 1, wherein the access key is data that is used to index the data structure in the secure database.

3. The method of claim 1, wherein the one or more filtering parameters impose an access control limit access to the identified real-time stream of content generated by the wearable device.

4. The method of claim 1, wherein the one or more filtering parameters include an expiration date or expiration time that, when the expiration date or expiration time is reached, causes access, by the second device, to the identified real-time stream of content data to be terminated.

5. The method of claim 1, wherein the one or more filtering parameters include a date and time period when the identified real-time stream of content generated by the wearable device can be accessed by a user of the second user device.

6. The method of claim 1, wherein the received data includes additional data that identifies a user of the second user device.

7. The method of claim 6, wherein accessing, by the one or more computers of the application server, the data structure in the secure database using the obtained set of permissions comprises:
   determining, by the one or more computers of the application server, the additional data that identifies the user of the second device is on a white list; and
   based on determining, by the one or more computers of the application server, that the additional data that identifies the user of the second device is included on the white list, using data within the second field of the data structure to access the real-time stream of content generated by a wearable device.

8. A system for enabling third-party password-less access to a secure database, the system comprising:
   an application server; and
   one or more memory devices storing instructions that, when executed by the one or more computers, cause the one or more computers to perform operations, the operations comprising:
      receiving, by one or more computers of the application server and from a first user device, first data indicative of a request to provide password-less access to a data structure in a secure database that is otherwise accessible via an application interface requiring a user-id and password, wherein the data structure includes a plurality of fields, wherein the plurality of fields include at least (i) a first field storing data indicating an access key and (ii) a second field that identifies a real-time stream of content generated by a wearable device;
      encoding, by the one or more computers of the application server, a set of permissions into a data string that, when rendered by a user device, causes the user device to display a hyperlinked uniform resource locator that references the data structure in the secure database and includes the encoded set of permissions, the encoded set of permissions including (a) a copy of the access key and (b) one or more filtering parameters;
      generating, by the one or more computers of the application server, an electronic message that includes the data string;
      providing, by the one or more computers of the application server, the electronic message to a second user device, wherein the second user device is configured to receive, render the electronic message, and display a hyperlinked uniform resource locator that includes the encoded set of permissions;

receiving, by the one or more computers of the application server, data indicative of a selection of the displayed hyperlinked uniform resource locator, the received data includes the encoded set of permissions;

decoding, by the one or more computers of the application server, the received data to obtain the set of permissions;

accessing, by the one or more computers of the application server, the data structure in the secure database using the obtained set of permissions;

providing, by the one or more computers of the application server and to the second user device, password-less access to the real-time stream of content associated with the accessed data structure and generated by the wearable device;

obtaining, by the one or more computers of the application server, an alert message from the second user device, wherein the alert message indicates that a value of the real-time stream of content has satisfied one or more predetermined thresholds; and based on obtaining, by the one or more computers of the application server, the obtained alert message, transmitting, by the one or more computers of the application server, a notification to a third user device that is identified in a user profile of a person wearing the wearable device.

9. The system of claim 8, wherein the access key is data that is used to index the data structure in the secure database.

10. The system of claim 8, wherein the one or more filtering parameters impose an access control limit access to the identified real-time stream of content generated by the wearable device.

11. The system of claim 8, wherein the one or more filtering parameters include an expiration date or expiration time that, when the expiration date or expiration time is reached, causes access, by the second device, to the identified real-time stream of content data to be terminated.

12. The system of claim 8, wherein the one or more filtering parameters include a date and time period when the identified real-time stream of content generated by the wearable device can be accessed by a user of the second user device.

13. The system of claim 8, wherein the received data includes additional data that identifies a user of the second user device.

14. The system of claim 13, wherein accessing, by the one or more computers of the application server, the data structure in the secure database using the obtained set of permissions comprises:

determining, by the one or more computers of the application server, the additional data that identifies the user of the second device is on a white list; and based on determining, by the one or more computers of the application server, that the additional data that identifies the user of the second device is included on the white list, using data within the second field of the data structure to access the real-time stream of content generated by a wearable device.

15. One or more non-transitory computer-readable storage media storing instructions that, when executed by one or more computers of an application server, cause the application server to perform operations, the operations comprising:

receiving, by the one or more computers of the application server and from a first user device, first data indicative of a request to provide password-less access to a data structure in a secure database that is otherwise accessible via an application interface requiring a user-id and password, wherein the data structure includes a plurality of fields, wherein the plurality of fields include at least (i) a first field storing data indicating an access key and (ii) a second field that identifies a real-time stream of content generated by a wearable device;

encoding, by the one or more computers of the application server, a set of permissions into a data string that, when rendered by a user device, causes the user device to display a hyperlinked uniform resource locator that references the data structure in the secure database and includes the encoded set of permissions, the encoded set of permissions including (a) a copy of the access key and (b) one or more filtering parameters;

generating, by the one or more computers of the application server, an electronic message that includes the data string;

providing, by the one or more computers of the application server, the electronic message to a second user device, wherein the second user device is configured to receive, render the electronic message, and display a hyperlinked uniform resource locator that includes the encoded set of permissions;

receiving, by the one or more computers of the application server, data indicative of a selection of the displayed hyperlinked uniform resource locator, the received data includes the encoded set of permissions;

decoding, by the one or more computers of the application server, the received data to obtain the set of permissions;

accessing, by the one or more computers of the application server, the data structure in the secure database using the obtained set of permissions;

providing, by the one or more computers of the application server and to the second user device, password-less access to the real-time stream of content associated with the accessed data structure and generated by the wearable device;

obtaining, by the one or more computers of the application server, an alert message from the second user device, wherein the alert message indicates that a value of the real-time stream of content has satisfied one or more predetermined thresholds; and based on obtaining, by the one or more computers of the application server, the obtained alert message, transmitting, by the one or more computers of the application server, a notification to a third user device that is identified in a user profile of a person wearing the wearable device.

16. The one or more computer-readable storage media of claim 15, wherein the one or more filtering parameters include an expiration date or expiration time that, when the expiration date or expiration time is reached, causes access, by the second device, to the identified real-time stream of content data to be terminated.

17. The one or more computer-readable storage media of claim 15, wherein the received data includes additional data that identifies a user of the second user device.

18. The one or more computer-readable storage media of claim 17, wherein accessing, by the one or more computers of the application server, the data structure in the secure database using the obtained set of permissions comprises:

determining, by the one or more computers of the application server, the additional data that identifies the user of the second device is on a white list; and based on determining, by the one or more computers of the application server, that the additional data that identifies the user of the second device is included on the white list, using data within the second field of the data structure to access the real-time stream of content generated by a wearable device.

* * * * *